United States Patent [19]
Jensen et al.

[11] Patent Number: 5,210,858
[45] Date of Patent: May 11, 1993

[54] CLOCK DIVISION CHIP FOR COMPUTER SYSTEM WHICH INTERFACES A SLOWER CACHE MEMORY CONTROLLER TO BE USED WITH A FASTER PROCESSOR

[76] Inventors: Jan E. B. Jensen, 6090 Farmstead Land, Mississauga, Ontario; Keith S. K. Lee, 164 Westminsiter Ave., Toronto, Ontario; J. David Mulvenna, 3098 Keynes Crescent, Mississauga, Ontario; Keith B. Riley, 65 Cotton Drive, Port Credit, Ontario, all of Canada

[21] Appl. No.: 422,839

[22] Filed: Oct. 17, 1989

[51] Int. Cl.$^5$ ............................................. G06F 13/00
[52] U.S. Cl. .................................... 395/550; 395/250; 395/425
[58] Field of Search ............... 364/270.1, 271.2, 271.5; 395/550, 250, 425

[56] References Cited

U.S. PATENT DOCUMENTS

| 4,258,417 | 3/1981 | Berglund et al. | 364/200 |
| 4,884,198 | 11/1989 | Garner et al. | 364/200 |
| 4,992,930 | 2/1991 | Gilfeather et al. | 364/200 |

FOREIGN PATENT DOCUMENTS 2181578A 4/1987 United Kingdom ...................... 1/4

OTHER PUBLICATIONS

Wescon/87 Conference Record vol. 31, 28 Feb. 1987, Los Angeles, U.S.A. pp. 1–4.
Computer Design, vol. 26 No. 5, 1 Mar. 1987, Littleton, Mass. U.S. pp. 63–71.

Primary Examiner—Eugene R. LaRoche
Assistant Examiner—Christopher R. Glembocki
Attorney, Agent, or Firm—Skjerven, Morrill, MacPherson, Franklin & Friel

[57] ABSTRACT

A clocking control circuit for a computer system and method for receiving a microprocessor clock signal which drives a microprocessor and for supplying a support clock signal having a lower frequency. The support clock frequency drives support interface circuitry such as a peripheral controller, a CPU/memory controller, and a bus bridge interface, and thus causes the support interface circuitry to operate at a lower frequency than the microprocessor. The clocking control circuit ensures synchronization between the support clocking signal and the microprocessor clocking signal. The transmission of control signals between the microprocessor and support interface circuitry is controlled to ensure proper communications between the microprocessor and support circuitry.

8 Claims, 9 Drawing Sheets

CLOCK DIVISION CHIP FOR COMPUTER SYSTEM WHICH INTERFACES A SLOWER CACHE MEMORY CONTROLLER TO BE USED WITH A FASTER PROCESSOR

BACKGROUND OF THE INVENTION

1. Field of the Invention

This invention relates to computer systems and more specifically to a clock division chip for interfacing a microprocessor to support circuitry.

2. Description of the Prior Art

The frequency at which microprocessors operate within computer systems has progressively increased with advances in microprocessor design and technology. Required execution time for performing specific microprocessor operations has consequently decreased, thus improving the efficiency of the computer system.

Design of microprocessors capable of operating at higher execution frequencies has been an ongoing developmental objective. However, with silicon-based microprocessors approaching theoretical limits in density of features and therefore circuit speed, designers are exploring new materials, such as galium arsenide, to develop microprocessors which operate at higher frequencies.

The speed at which a computer system accomplishes a particular task is usually not, however, exclusively dependent simply upon the speed of the microprocessor. The speed of support circuitry and system memory can also dictate the time required to perform a particular task. It is desirable to provide data to and from the main memory, peripherals, and microprocessor without limiting the speed at which the program code is processed. Unfortunately, much of the system memory and peripherals are incapable of handling data at the speed of the microprocessor. This incapability degrades the overall performance of the system.

Since the main memory is often slower than the microprocessor, wait states are required when the memory is being accessed. The required wait states cause corresponding delays in the speed of the overall computer system.

To improve system speed, a faster cache memory system is commonly used. A cache memory is interposed in the memory hierarchy between main memory and the CPU (central processing unit) to improve effective memory transfer rates and, accordingly, raise processing speeds. The name "cache memory" refers to the fact that the memory is essentially hidden and appears transparent to the user, who is aware only of an apparently higher-speed large main memory. The cache memory is usually implemented by semiconductor devices whose speeds are compatible with that of the processor, while the main memory utilizes a less costly, lower-speed semiconductor technology. The cached concept anticipates the likely reuse by the CPU of information in main storage by organizing a copy of the information in cache memory. Often, for example, approximately 90% of the software code being executed resides in the cache memory.

Support interface circuitry for the computer system typically includes a CPU/Memory controller, a peripheral controller, and a bus bridge interface. As microprocessors are upgraded to operate at higher frequencies, it is often necessary to upgrade and redesign the support interface circuitry to allow for operation at the higher frequencies. The cost of upgrading the design of the support interface circuitry is often high, however. Manufacturing costs are correspondingly high since semiconductor production processes must be modified to produce the upgraded faster operating circuitry.

The GCK131 80386 AT Compatible Three Chip Set, sold by G-2 Incorporated, is an example of a set of support interface circuitry. The GCK131 Chip Set consists of three highly integrated HCMOS microchips and supports an Intel 80386 microprocessor based computer system in AT-compatible mode at speeds up to 25 MHZ. The three chip set allows the implementation of a computer system with simply an 80386 microprocessor, a keyboard controller, a real time clock, several semiconductor devices, and memory.

The GCK131 Chip Set includes the GC131 Peripheral Controller, the GC132 CPU/Memory Controller, and the GC133 Bus Bridge Interface. A block diagram of a typical 80386 system using the GCK131 Chip Set is shown in FIG. 1. The GC131 Peripheral Controller supports the system with conventional INTERRUPT, TIMER, DMA/REFRESH, and I/O services. The GC132 CPU/Memory Controller controls the CPU and the memory including control of timing, synchronization, addressing, parity, bus conversion, and the AT bus module. The GC133 transfers data between the high-speed bus to the slower ATD bus. The GC133 Bus Bridge Interface essentially consists of a buffer, latch, and comparator.

The GCK131 Chip Set is designed to operate at a maximum frequency of 25 MHZ. Until recently, the Intel 80386 microprocessor also had a maximum operating frequency of 25 MHZ. In response to demand for faster microprocessors, however, Intel developed an 80386 microprocessor which operates at 33 MHZ. The GCK131 Chip Set is unable to operate at frequencies above 25 MHZ. It would be a difficult and expensive developmental task to upgrade the allowable operating frequency of the GCK131 Chip Set to 33 MHZ.

SUMMARY OF THE INVENTION

A large majority of the code being executed in a cache based computer system is stored in a cache memory having a zero wait state. Therefore, while the microprocessor, cache memory, and cache controller of a computer system need to operate at a high frequency for optimal system performance, the remainder of the computer system in accordance with the invention can operate at a much lower clock frequency with little or no degradation in overall system performance.

In accordance with the invention, a method and device allow the GCK131 Chip Set to support an 80386 microprocessor operating at 33 MHZ. A clocking control circuit adaptable to a cache-based computer system receives a first clock signal which drives a microprocessor. The clocking control circuit supplies a support clock signal having a lower frequency which drives support interface circuitry such as a peripheral controller, a CPU/Memory controller, and a bus bridge interface. The support interface circuitry thus operates at a lower frequency than the microprocessor. The clocking control circuit also ensures synchronization between the support clocking signal and the first clocking signal. The transmission of control signals between the microprocessor and support interface circuitry is controlled by the clocking control circuit to ensure proper communication between the microprocessor and support interface circuitry.

The clocking control circuit comprises means for increasing the time duration of signals transmitted from the cache controller to the support interface circuitry, and means for decreasing the time duration of signals transmitting from the support interface circuitry to the cache controller.

The clocking control circuit may also comprise means for receiving a first clock signal which drives the microprocessor and cache controller and for supplying a support clock signal which drives support interface circuitry having a lower frequency than that of the first clock signal. The clocking control circuit preferably includes a means for synchronizing an internal clock of the microprocessor with the support clock signal. In one embodiment, the clocking control circuit is contained on a single integrated circuit chip.

By way of the present invention, the microprocessor, cache memory, and cache controller may operate at a higher frequency than the support interface circuitry. Control and other signals which transmit between the cache controller and the support interface circuitry are modified or conditioned such that the clocking regime of the cache controller is compatible with the slower clocking regime of the support interface circuitry. Design and manufacturing costs are thereby reduced since the support interface circuitry, such as the GCK131 Chip Set, do not need upgrading for operation at the speed of the microprocessor.

Furthermore, since the main memory of the computer cannot be accessed at the frequency of the microprocessor clock regardless of the speed at which the support interface circuitry operates, and since most of the code executed by the microprocessor resides in cache memory, little or no overall performance degradation occurs.

Finally, since the support interface circuitry operates at a lower frequency, timing margins are relaxed, power consumption is reduced, and electromagnetic interference (EMI) is minimized.

The invention will be more readily understood by reference to the drawings and the detailed description. As will be appreciated by one skilled in the art, the invention is applicable to computer systems using microprocessors, cache controllers, and support interface circuitry, and is not limited to those disclosed in the preferred embodiment.

DETAILED DESCRIPTION

Figure 1:
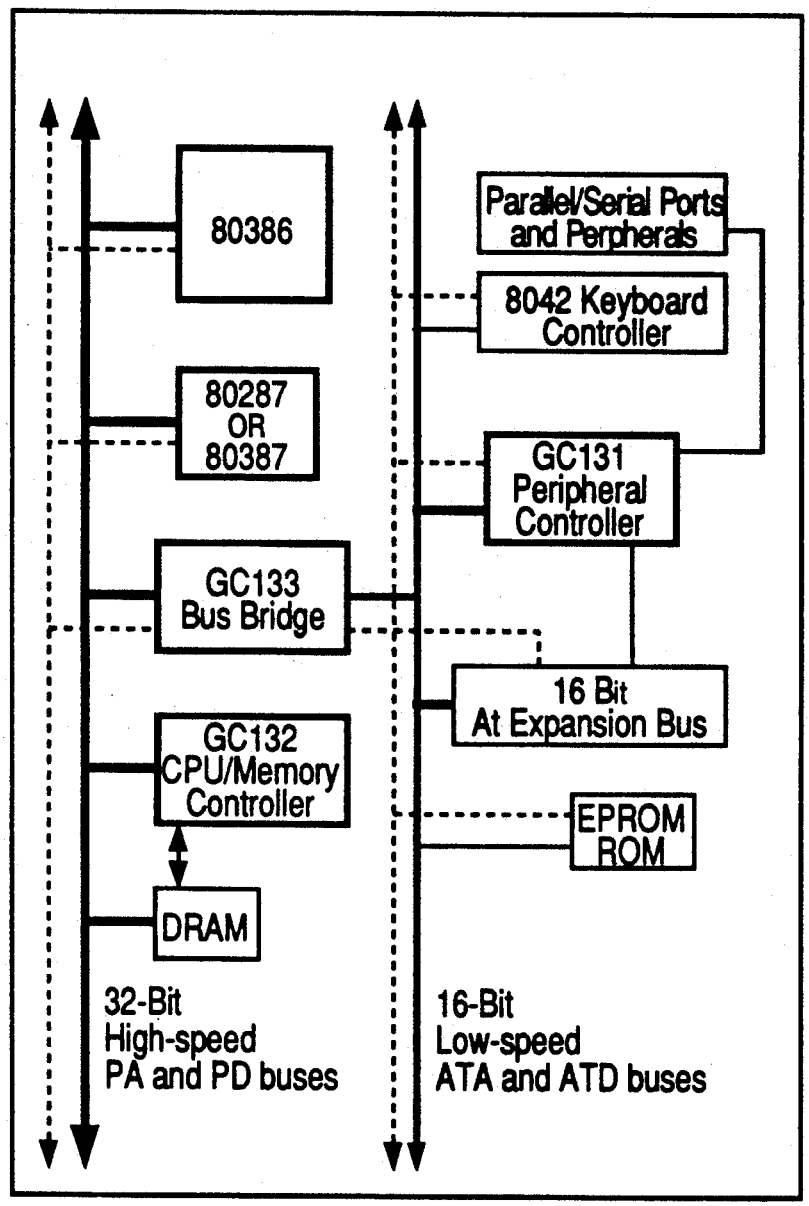
FIG. 1 is a block diagram of an 80386 computer system.
Figure 2:
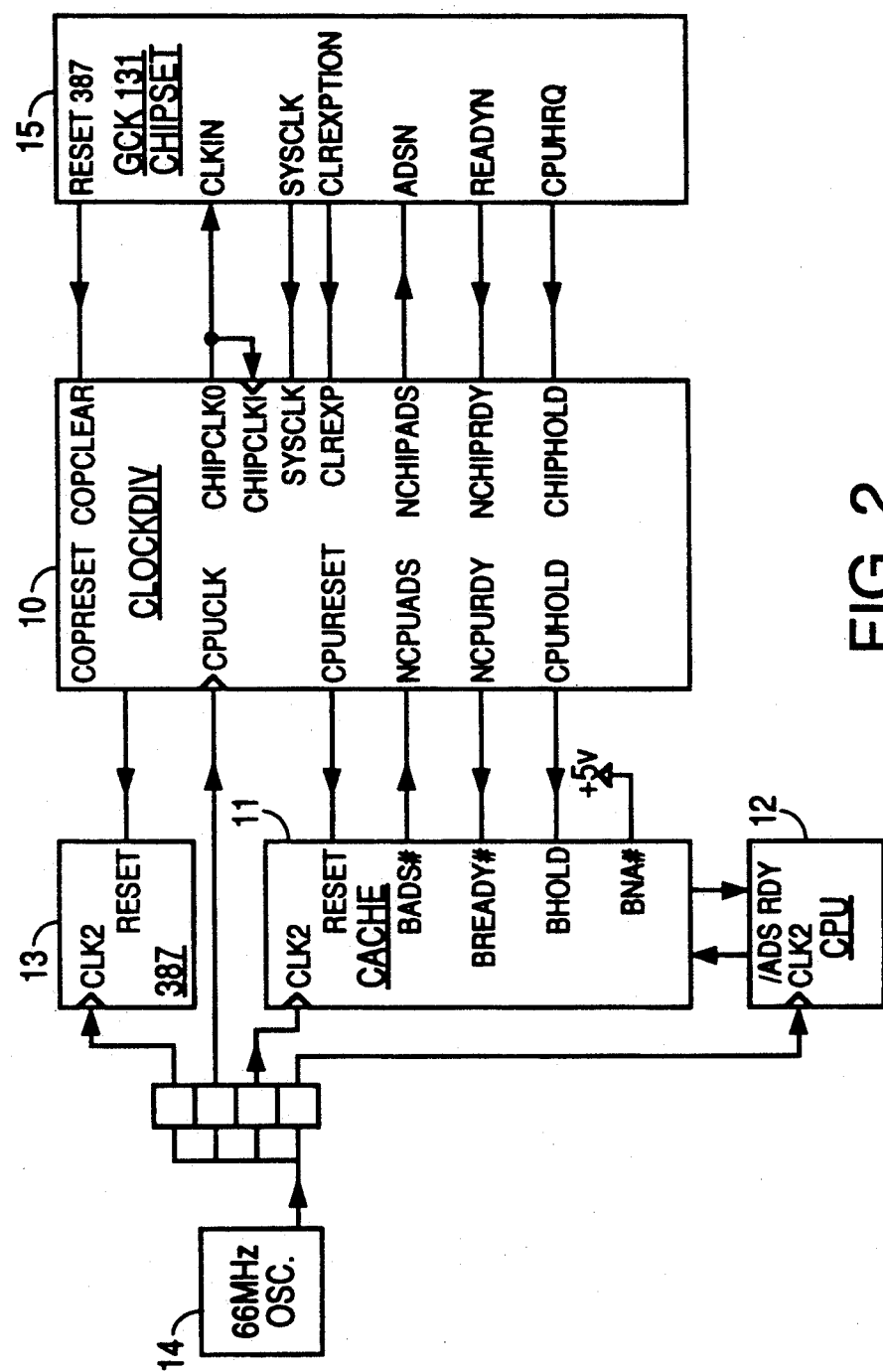
FIG. 2 is a block diagram of a clocking control circuit connected to a computer system.

Referring to FIG. 2, there is shown a block diagram of a preferred embodiment of a clock division chip (a clocking control circuit) 10 connected to various components of a computer system. In this preferred embodiment, clocking control circuit 10 is contained within an integrated circuit chip designated as CLOCKDIV. The computer system includes a cache memory controller 11, an Intel 80386 microprocessor 12, an Intel 80387 numeric co-processor 13, a 66 MHZ oscillator 14, and an LSI GCK131 Chip Set 15. GCK131 Chip Set 15 consists of a GC131 Peripheral Controller, a GC132 CPU/Memory Controller, and a GC133 Bus Bridge Interface. GCK131 Chip Set 15 connects peripheral and support circuits (not shown) operating in the remainder of the computer system. GCK131 Chip Set 15 is known to those skilled in the art and is described in the GCK131 Chip Set Preliminary Specification published in May of 1989 which is herein incorporated by reference and available from G-2 Incorporated.

Clocking control circuit 10 is connected to GCK131 Chip Set 15, cache controller 11, 66 MHz oscillator clock 14, and co-processor 13. Input signals are received by clocking control circuit 10 at the CPUCLK, NCPUADS, COPCLEAR, CHIPCLKI, SYSCLK, CLREXP, NCHIPRDY, and CHIPHOLD terminals. Output signals are supplied from clocking control circuit 10 at the COPRESET, CPURESET, NCPURDY, CPUHOLD, CHIPCLKO, and NCHIPADS terminals. The input and output signals transmitting to and from these terminals are explained in more detail below.

The COPRESET terminal is connected to a RESET terminal of co-processor 13. The CPUCLK terminal is connected to oscillator 14. The CPURESET, NCPUADS, NCPURDY, and CPUHOLD terminals are connected to RESET, BADS#, BREADY# and BHOLD terminals, respectively, of cache controller 11. The remaining terminals of clocking control circuit 10 are connected to GCK131 Chip Set 15. The COPCLEAR terminal is connected to a RESET 387 terminal, the CHIPCLKO and CHIPCLKI terminals are connected to a CLKIN terminal, the SYSCLK terminal is connected to a SYSCLK terminal of chip set 15, the CLREXP terminal is connected to a CLREXPTION terminal, the NCHIPADS terminal is connected to an ADSN terminal, the NCHIPRDY terminal is connected to a READY terminal, and the CHIPHOLD terminal is connected to a CPUHRQ terminal.

In operation, clocking control circuit 10 receives a standard 66 MHZ clock signal at the CPUCLK terminal, divides the frequency of this signal to 33 MHZ, and outputs a 33 MHz clock signal. The 66 MHz clock signal is also received by cache controller 11, microprocessor 12, and coprocessor 13. The 33 MHZ clock signal is supplied to GCK131 Chip Set 15 from the CHIPCLKO terminal. A module within the clocking control circuit 10 maintains synchronization between the 66 MHZ and 33 MHZ clock signals. This module is explained in detail below.

Clocking control circuit 10 also interfaces signals which transmit between cache controller 11 and Chip Set 15. Clocking control circuit 10 conditions these signals such that signals transmitted from cache controller 11 are lengthened in time duration to be compatible with chip set 15 which operates at a lower frequency. In other words, the time period (duration) of certain signals transmitting from cache controller 11 is increased in order that they are recognizable by chip set 15. Conversely, signals transmitted from chip set 15 are shortened in time duration to be compatible with cache controller 11 and microprocessor 12 which operate at a higher frequency than does chip set 15.

Figure 3:
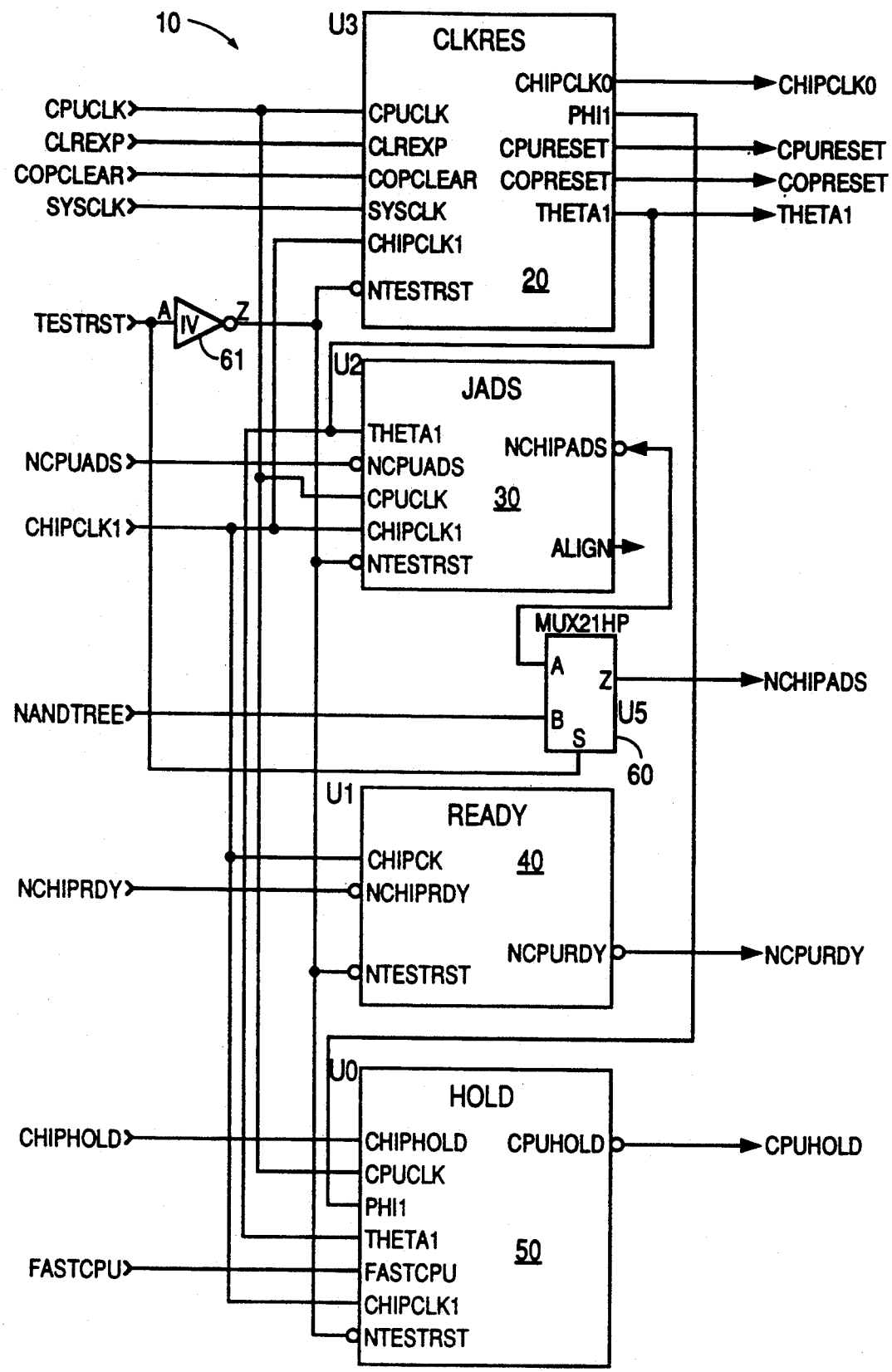
FIG. 3 is a block diagram of the modules within the clocking control circuit.

Referring next to FIG. 3, clocking control circuit 10 consists of a CLKRES module 20, a JADS module 30, a READY module 40, a HOLD module 50, a multiplexer 60, and an inverter 61. The circuitry and operation of each of these modules is explained below.

Inverter 61 provides an inverted TESTRST signal to an NTESTRST terminal of each module. When a signal at the TESTRST terminal goes HIGH, each module resets. The TESTRST signal places the flip-flops in a known state and is used to test the chip.

In one embodiment of the invention, the TESTRST signal is also applied to a selector input of multiplexer 60. Multiplexer 60 is used to eliminate the requirement for an additional output pin on the chip. Depending upon the value of the selector signal, TESTRST, one of two input signals are provided to the output of multiplexer 60 at the NCHIPADS terminal. When the TESTRST signal is high, a signal on the NANDTREE terminal is selected and provided to the NCHIPADS terminal. The signal NANDTREE is used only during chip testing to check the operation of the chip's input buffers. During normal operation, the signal on the TESTRST terminal is LOW, and consequently the A input of multiplexer 60 is selected to provide an output to the NCHIPADS terminal.

Figure 4:
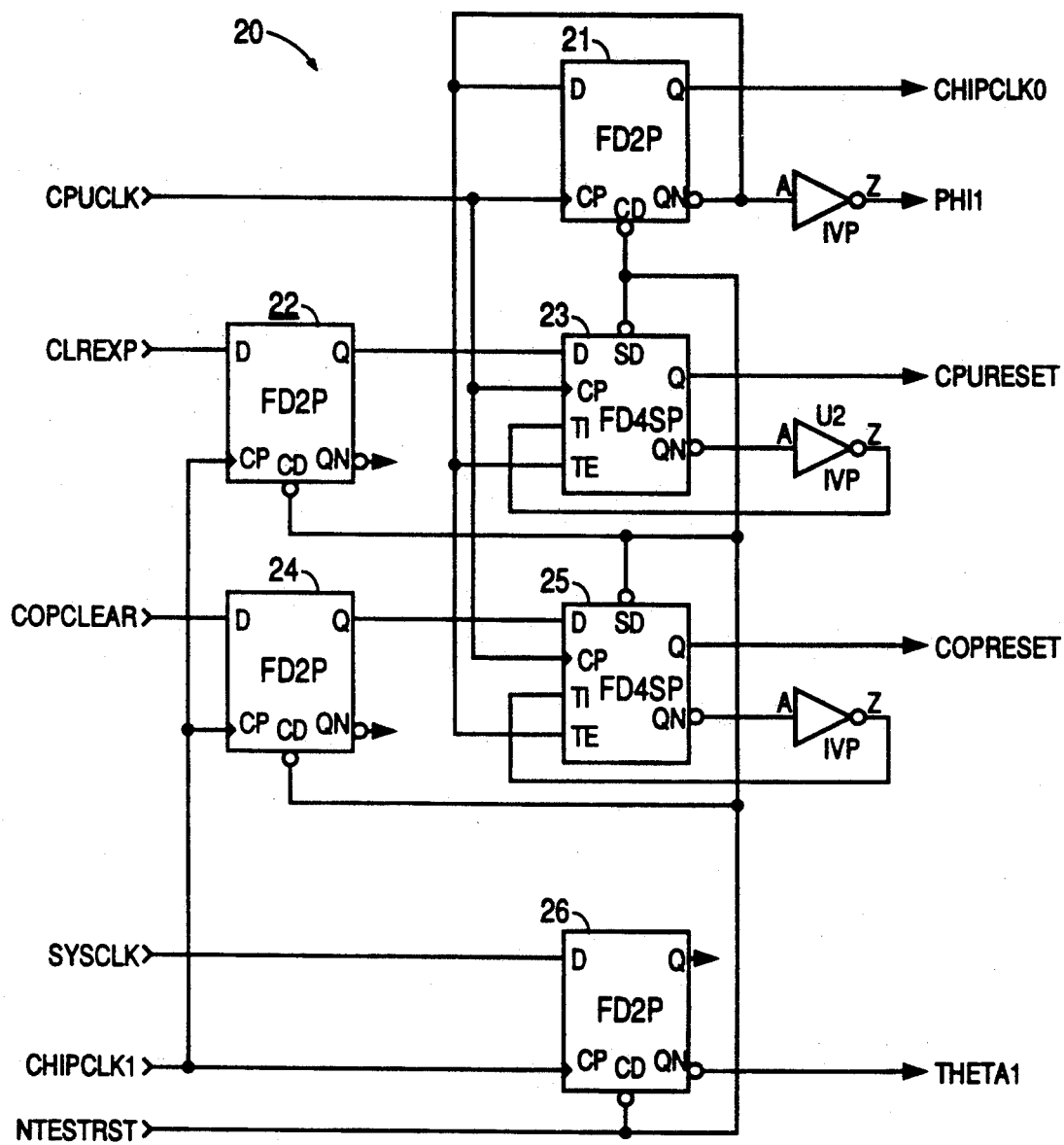
FIG. 4 is a schematic diagram of the CLKRES module.

A schematic of CLKRES module 20 is shown in FIG. 4. The CPUCLK terminal is connected to the clock input of flip-flop 21. Since the QN output of flip-flop 21 is fed back to the D input of flip-flop 21, an output signal to the CHIPCLKO terminal is provided having a frequency which is half the frequency of the signal at the CPUCLK terminal. The signal at the CHIPCLKO terminal is designated as CHIPCLK.

The CLREXP terminal is connected to the input of flip-flop 22. The output of flip-flop 22 is connected to the input of flip-flop 23. The output of flip-flop 23 is correspondingly connected to the CPURESET terminal. When a signal at the CLREXP terminal goes LOW, the output of flip-flop 22 will go LOW on the next rising edge of the clock signal at the CHIPCLKI terminal. After the output of flip-flop 22 goes LOW, the output of flip-flop 23 goes LOW on a succeeding rising edge of the clock signal at the CPUCLK terminal. Thus, the CPURESET signal can go LOW only on a falling edge of the clock signal at the CHIPCLKI terminal.

Figure 5:
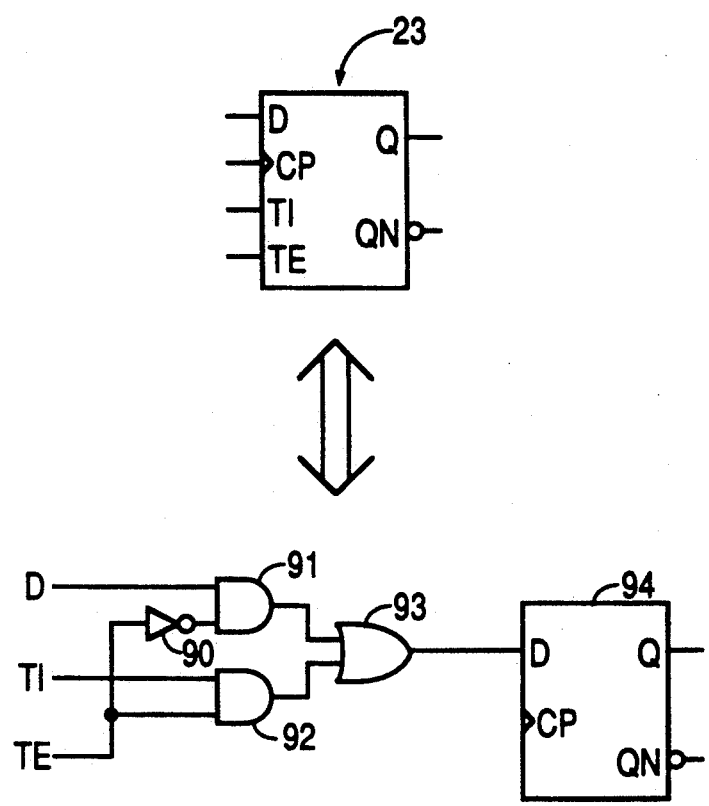
FIG. 5 shows an equivalent circuit diagram for a flip-flop having D, TE and TI input terminals.

A circuit which is functionally equivalent to flip-flop 23 is shown in FIG. 5. The equivalent circuit consists of an inverter 90, AND gates 91 and 92, an OR gate 93, and a conventional type D flip-flop 94. The D input of flip-flop 23 is sampled when its TE input is low (and on the rising edge of the CP input). When the TE input is high, the TI input is sampled rather than the D input.

Referring back to FIG. 4, the COPCLEAR terminal is connected to the input of flip-flop 24. The output of flip-flop 24 is connected to the input of flip-flop 25. The output of flip-flop 25 is correspondingly connected to the COPRESET terminal. The circuitry generating the signal at the COPRESET terminal is identical to the circuitry generating the signal at the CPURESET terminal. Hence, the analysis described above in relation to the signal on the CPURESET terminal applies analogously to the signal on the COPRESET terminal.

Flip-flop 26 has a D input connected to the SYSCLK terminal and a clock input connected to the CHIPCLKI terminal. The signal at the SYSCLK terminal is synchronous to the signal at the CHIPCLKI terminal and is generated by the GCK131 Chip Set circuitry. The signal at the SYSCLK terminal has a frequency that is half the frequency of the signal at the CHIPCLKI terminal. The signal generated by flip-flop 26 at the THETA1 terminal indicates the phase of chip set 15. The signal at the THETA1 terminal is a modified version of the signal at the SYSCLK terminal which has been sampled by the CHIPCLK signal and inverted, in order to reduce the timing skew with respect to the clock signal CPUCLK. The signal at THETA1 is used by the JADS and HOLD modules, as explained below.

Figure 9:
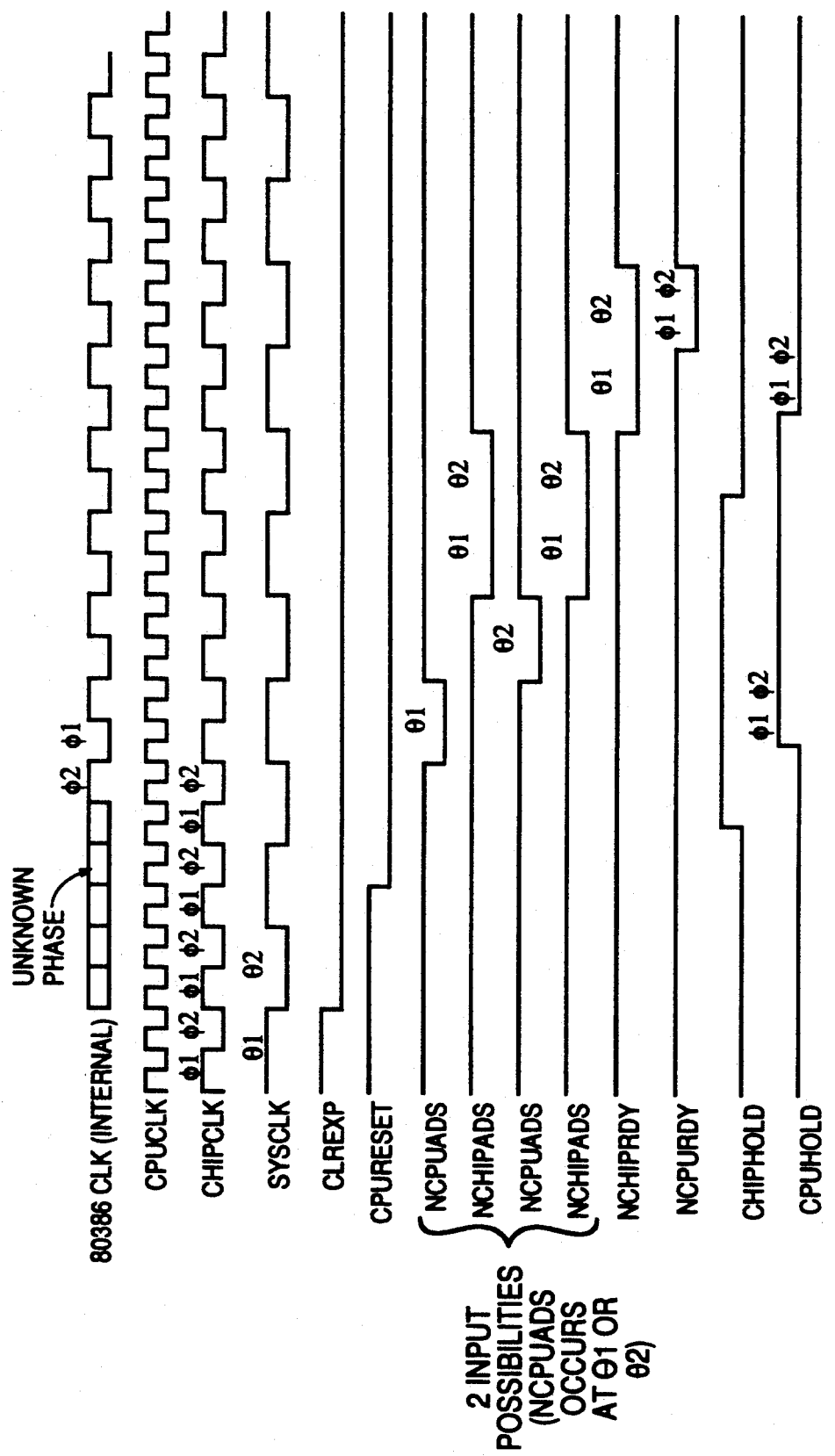
FIG. 9 is a timing diagram for selected signals transmitting to and from the clocking control circuit.

Referring to the schematic of FIG. 4 in conjunction with the timing diagram of FIG. 9 and the block diagram of FIG. 2, CLKRES module 20 receives a 66 MHZ clock signal designated as CPUCLK at the CPUCLK terminal. The frequency of the CPUCLK signal is divided by two, and the resulting signal, designated CHIPCLK, is a 33 MHZ clock signal for GCK131 Chip Set 15 provided at the CHIPCLKO terminal.

The Intel 80386 microprocessor 12 also receives the 66 MHZ CPUCLK signal at a clock input and internally divides the frequency of the signal to a 33 MHZ internal clock signal. The timing diagram of FIG. 9 shows this internal clock signal as well as the CPUCLK and CHIPCLK signals. The CHIPCLK signal and the internal clock signal of microprocessor 12 each have two phases, referred to as PHI1 ($\phi1$) and PHI2 ($\phi2$).

The 33 MHZ CHIPCLK signal is received by chip set 15 and is further divided by the chip set circuitry. The resulting 16.5 MHZ signal, SYSCLK, is provided to CLKRES module 20 of the clocking control circuit 10. The SYSCLK signal has two phases referred to as THETA1 ($\theta1$) and THETA2 ($\theta2$). As shown in the timing diagram in FIG. 9, the SYSCLK signal is synchronous with the CHIPCLK signal, such that the leading edge of THETA1 of the SYSCLK signal corresponds to the leading edge of PHI1 of the CHIPCLK signal.

The internal clock of microprocessor 12 must have a proper phase relationship to the SYSCLK signal. This phase relationship is defined such that the leading edge of THETA1 of the SYSCLK signal is synchronous to the leading edge of PHI1 of the internal clock signal. This phase relationship is shown in the timing diagram of FIG. 9.

The sequence which establishes the proper phase relationship between the internal clock signal of microprocessor 12 and the SYSCLK signal begins when the CLREXP signal is output from chip set 15 and received by clocking control circuit 10. In the GCK131 Chip Set 15, the CLREXP signal always drops to LOW on the trailing edge of a THETA1 ($\theta1$) phase of the SYSCLK signal. When the CLREXP signal drops to LOW, clocking control circuit 10 is synchronized with the GCK131 Chip Set 15.

After the CLREXP signal is received by clocking control circuit 10 and after there is synchronization between clocking control circuit 10 and chip set 15, microprocessor 12 must be synchronized. Microprocessor 12 synchronization occurs when a LOW CPURESET signal from clocking control circuit 10 is applied to microprocessor 12. The CPURESET signal drops LOW two full CHIPCLK phases after CLREXP has dropped LOW. In the timing diagram of FIG. 9, the CPURESET signal goes LOW at the trailing edge of PHI1 ($\phi1$) of CHIPCLK.

The Intel 80386 microprocessor 12 synchronizes its internal clock signal such that phase PHI2 (100 2) occurs one full internal clock cycle after the fall of the CPURESET signal. As shown in FIG. 9, PHI1 ($\phi$1) of the internal 80386 clock is synchronous with PHI1 ($\phi$1) of the CHIPCLK signal from clocking control circuit 10 after the CPURESET signal drops LOW. Since the leading edge of THETA1 ($\theta$1) of the SYSCLK signal from GCK131 Chip Set 15 is also synchronous with the leading edge of PHI1 ($\phi$1) of the CHIPCLK signal from clocking control circuit 10, THETA1 ($\theta$1) of the SYSCLK signal is synchronous with the leading edge of PHI1 ($\phi$1) of the internal clock signal of microprocessor 12. Therefore when the CLKEXP signal from the GCK131 Chip Set 15 has dropped LOW, the synchronization process between chip set 15 and microprocessor 12 begins.

The Intel 80387 co-processor 13 is reset similarly by the COPRESET signal from clocking control circuit 10. Since the circuitry within CLKRES module 20 which generates the COPRESET signal is identical to the circuitry which generates the CPURESET signal, timing diagrams analogous to those describing the CPURESET and CLREXP signals apply to the COPRESET and COPCLEAR signals.

Figure 6:
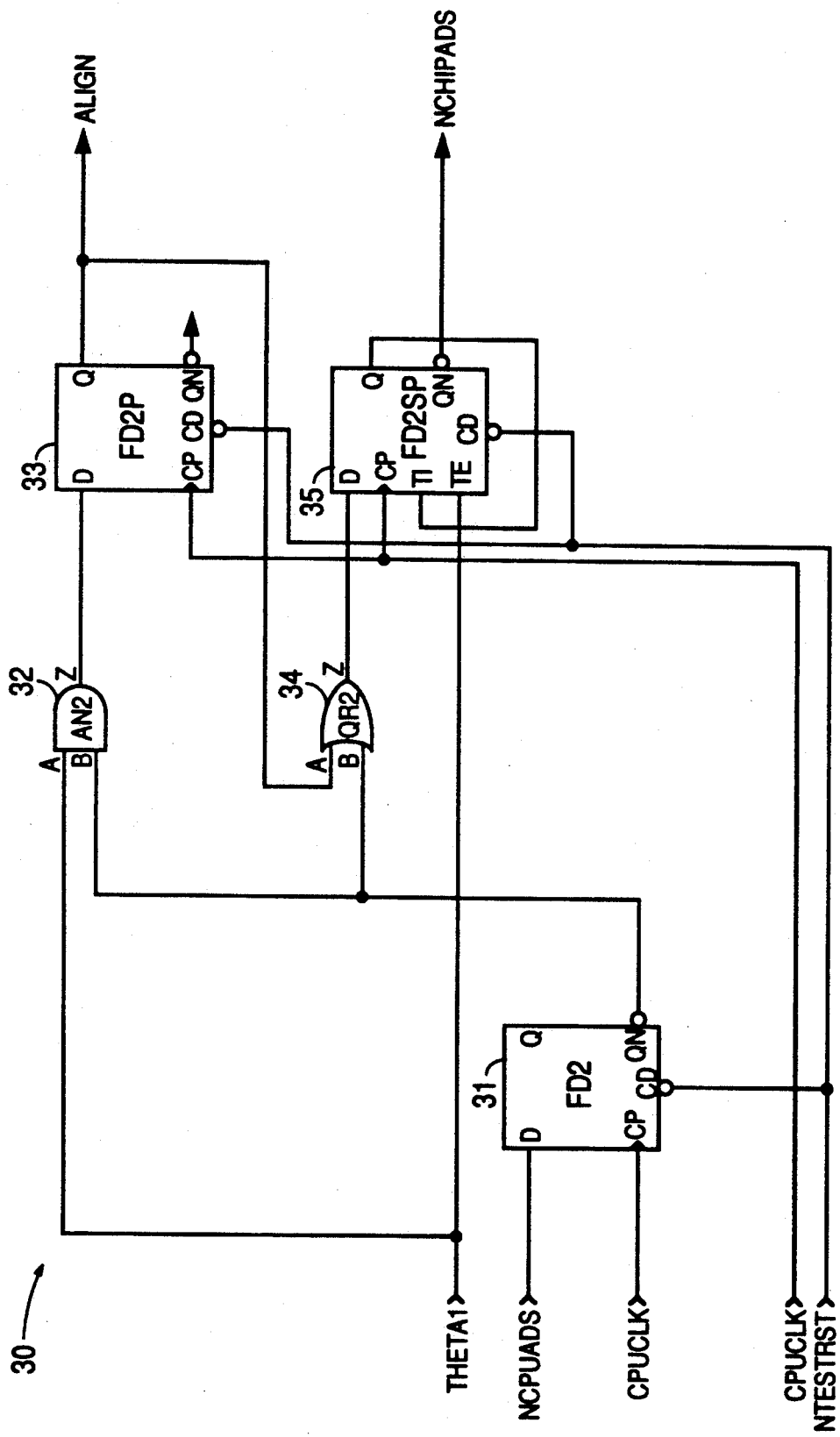
FIG. 6 is a schematic diagram of the JADS module.

A schematic of JADS module 30 is shown in FIG. 6. The NCPUADS terminal is connected to the D input of flip-flop 31. A signal at the NCPUADS terminal is designated the NCPUADS signal. This signal is sampled at each rising edge of the CPUCLK system. The output of an AND gate 32 goes HIGH when both the QN output of flip-flop 31 and the THETA1 signal are HIGH. The THETA1 signal is HIGH only when a THETA1 ($\theta$1) phase of the SYSCLK signal occurs. When the AND gate 32 output goes HIGH, a signal at the output of a flip-flop 33 goes HIGH on the next rising edge of the CHIPCLK signal. The output of flip-flop 33 is connected to an ALIGN terminal. The QN output of flip-flop 31 and the signal at the ALIGN terminal are applied to an OR gate 34 which has an output connected to a flip-flop 35. The D input of flip-flop 35 is sampled only during a THETA2 ($\theta$2) phase of the SYSCLK signal when the TE input is LOW. When the TE input is HIGH, flip-flop 35 will not change states since the T1 input is sampled which is connected to the Q output. The signal at the QN output of flip-flop 35, NCHIPADS, goes LOW only upon a rising edge of the CHIPCLK signal after the NCPUADS signal has gone LOW and at the completion of a THETA2 ($\theta$2) phase of the SYSCLK signal. The NCHIPADS signal stays LOW for a complete cycle of the SYSCLK signal after the NCPUADS signal has returned HIGH. The NCPUADS signal stays LOW until the next THETA2 ($\theta$2) phase occurs. When a THETA2 ($\theta$2) phase occurs, the NCPUADS signal is sampled high. The NCHIPADS signal consequently returns to high.

The JADS module includes means for increasing the time duration of signals transmitted to chip set 15 from cache controller 11. Since microprocessor 12 typically uses code directly in the cache memory, there is usually no requirement to go to main memory. When main memory access is required, a /ADS signal is generated by microprocessor 12 on PHI1 ($\phi$1) of its internal clock signal. The /ADS signal indicates the beginning of a bus cycle and is supplied to cache controller 11 on a cache miss by microprocessor 12. In response, cache controller 11 supplies a LOW NCPUADS signal at the BADS# terminal which is received at the NCPUADS terminal of clocking control circuit 10.

As illustrated in FIG. 9, the leading edge of PHI1 ($\phi$1) of the internal clock signal of microprocessor 12 can correspond to either the leading edge of THETA1 ($\theta$1) or THETA2 ($\theta$2) of the SYSCLK signal of the GCK131 Chip Set 15. In order for GCK131 Chip Set 15 to recognize the /ADS signal, however, the /ADS signal must be LOW at the start of THETA1 for one full cycle of the SYSCLK signal. JADS module 30 performs this operation.

Referring to FIG. 6 in conjunction with the timing diagram of FIG. 9, the NCPUADS signal from the BADS# terminal of cache controller 11 is sampled at each rising edge of the CPUCLK signal. It is possible that the NCPUADS signal could be sampled LOW during THETA1 ($\theta$1) of the SYSCLK signal or during THETA2 ($\theta$2) of the SYSCLK signal. These two possibilities are illustrated in FIG. 9.

If the NCPUADS signal is LOW during THETA1 ($\theta$1) of the SYSCLK signal, then the time at which the corresponding NCHIPADS signal is transmitted to GCK131 Chip Set 15 must be delayed. This delay occurs as a result of the signal at the ALIGN terminal, which goes HIGH upon detection of THETA1 ($\theta$1) of the NCPUADS signal. It should also be noted that flip-flop 35 is disabled during THETA1 ($\theta$1). The signal at the ALIGN terminal is held HIGH during THETA2 ($\theta$2) and released to LOW on the trailing edge of THETA2 ($\theta$2). Thus, the NCHIPADS signal is applied to the GCK131 chip set at the start of THETA1 ($\theta$1).

If, on the other hand, the NCPUADS signal goes LOW during THETA2 ($\theta$2) of the SYSCLK signal, the output at the ALIGN terminal is LOW. In this case, the output of OR gate 34 goes HIGH on a rising edge of CPUCLK, and consequently, the NCHIPADS signal is output LOW on the next phase of SYSCLK, which is THETA1 ($\theta$1). This output occurs since flip-flop 35 is enabled during a THETA2 ($\theta$2) phase.

The JADS module of FIG. 4 also effectively doubles the period or time duration of the /ADS signal. This doubling in the period of the /ADS signal is required since the /ADS signal is generated in a 33 MHz clocking regime, and must satisfy the timing requirements of GCK131 Chip Set 15 which is operating at half that frequency. The JADS module keeps the NCHIPADS signal LOW for one full SYSCLK cycle, whose period is defined as (THETA1+THETA2). Thus, upon receipt of the /ADS signal from the cache controller, clocking control circuit 10 outputs a corresponding signal having a leading edge which is synchronous with the leading edge of THETA1 and whose time duration is (THETA1+THETA2).

Figure 7:
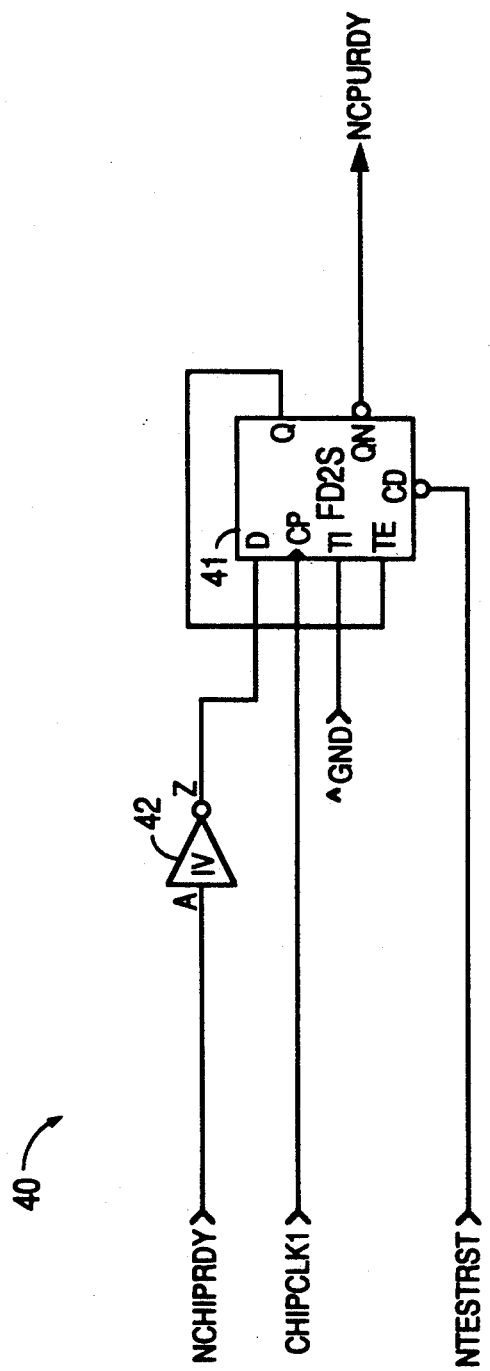
FIG. 7 is a schematic diagram of the READY module.

A schematic of the READY module 40 is shown in FIG. 7. The NCHIPRDY terminal is connected to flip-flop 41 through inverter 42. A signal at the NCHIPRDY terminal is sampled at a rate directed by each rising edge of a signal at the CHIPCLKI terminal. When the signal at the NCHIPRDY terminal goes LOW, the NCPURDY terminal at the output of flip-flop 41 goes LOW on the next rising edge of the signal at the CHIPCLKI terminal. When the signal at the NCHIPRDY terminal returns HIGH, the signal at the NCPURDY terminal returns HIGH. The TE terminal enables the D input to be sampled when TE is low. When TE is high, the TI input is sampled. Initially, the Q output will be LOW, and thus TE enables the D input. When NCHIPRDY goes LOW, the Q output goes HIGH and NCPURDY goes LOW on the next rising edge of the signal at the CHIPCLKI terminal (CHIPCLK). The TI input is consequently enabled. On the next rising edge of the CHIPCLK signal, the LOW TI input causes the Q output to return LOW since TI is LOW. NCPURDY thus returns HIGH.

In response to the completion of a main memory transaction, GCK131 Chip Set 15 sends a signal NCHIPRDY to cache controller 11. The period of this signal is (THETA1+THETA2) and its leading edge is always synchronous to the leading edge of PHI1. Microprocessor 12 expects this signal to have a width of (PHI1+PHI2) and therefore, the READY module of clocking control circuit 10 must make the appropriate modifications.

Specifically, referring to FIG. 9, the NCHIPRDY signal is sampled by the CHIPCLK signal in the READY module Once this signal is sampled LOW, a CPURDY signal is output at the NCPURDY terminal to cache controller 11 one CHIPCLK cycle later. The period of this signal is defined to be one CHIPCLK period, or (PHI1+PHI2).

Figure 8:
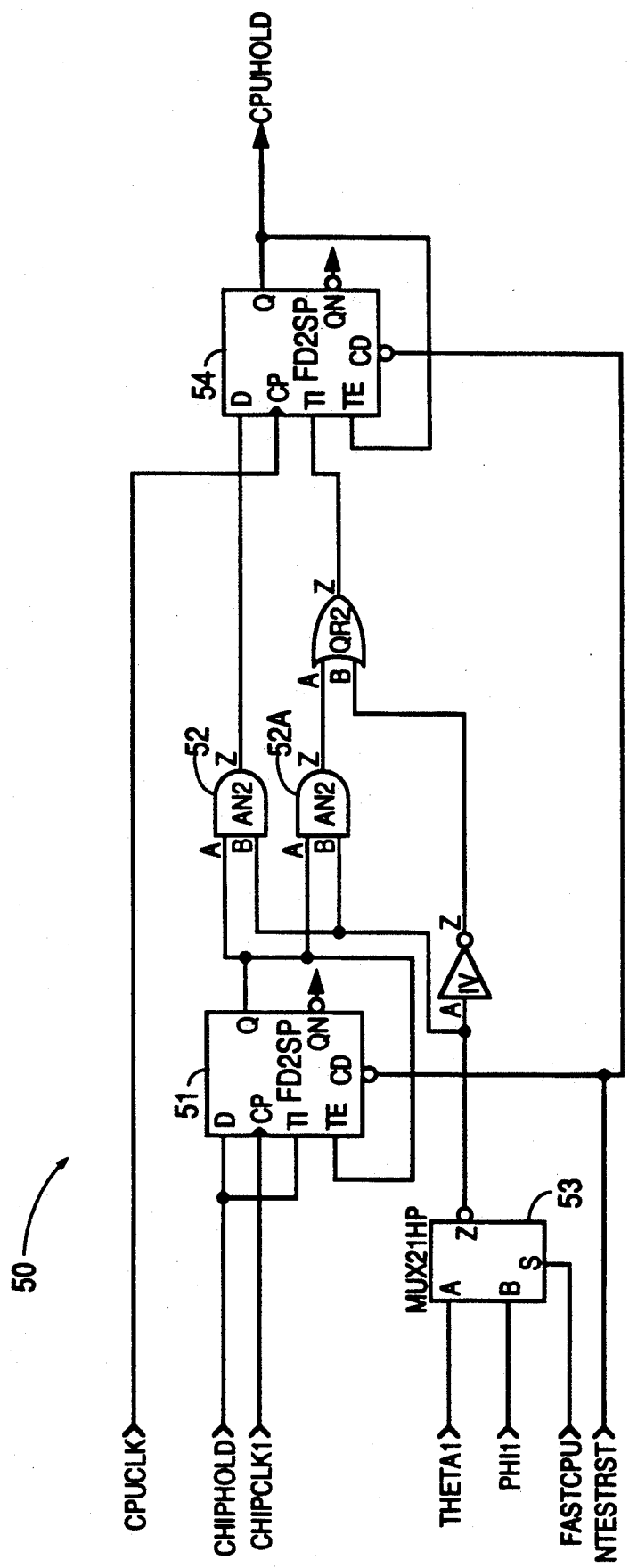
FIG. 8 is a schematic diagram of the HOLD module.

A schematic of the HOLD module 50 is shown in FIG. 8. The CHIPHOLD terminal is connected to a flip-flop 51 and sampled at each rising edge of CHIPCLKI. In the preferred embodiment, the FASTCPU terminal is always HIGH. Therefore, multiplexer 53 always selects the B input, which is a signal designated as PHI1. The PHI1 signal is high during each PHI1 ($\phi$1) phase of the CHIPCLK signal. The purpose of the HOLD module is to ensure that a CHIPHOLD signal coming from chip set 15 is properly phase aligned when it is transmitted to cache controller 11.

Referring to FIG. 8 in conjunction with FIG. 9, the CHIPHOLD signal coming from chip set 15 is sampled by flip-flop 51 at each rising edge of the clock signal CHIPCLK at the CHIPCLKI terminal. When the CHIPHOLD signal is sampled HIGH, the HIGH output of flip-flop 51 is received at an AND gate 52. AND gate 52 also receives the PHI2 signal through multiplexer 53 (because the PHI1 signal has been inverted by multiplexer 53). The output of AND gate 52 is correspondingly received at the input of a flip-flop 54. When flip-flop 54 is clocked by a rising edge of the 66 MHz signal CPUCLK, the resulting CPUHOLD signal is output on the leading edge of PHI1 (or the trailing edge of PHI2) of the internal clock signal of microprocessor 12.

Similarly, the trailing edge of the CPUHOLD signal must be synchronized. When the CHIPHOLD signal drops LOW, the change is detected by flip-flop 51 on a rising edge of the CHIPCLK signal. Again, the intermediate signal is gated through AND gate 52A during PHI2, and the resulting signal is output to the cache controller on the leading edge of PHI1. The trailing edge of CPUHOLD is the result of sampling flip-flop 54 input TI, which is allowed to change to low only during signal PHI2. This results in CPUHOLD falling only during the trailing edge of PHI2. This provides sufficient set up time for the CPUHOLD signal to the cache controller.

The embodiment described above is intended to be exemplary and not limiting. In view of the above disclosure, modifications will be obvious to one of ordinary skill in the art without departing from the scope of the invention.

We claim:

1. A clocking control circuit for a computer system, said computer system having a microprocessor, a cache controller operatively connected to said microprocessor for controlling cache memory, and support interface circuitry operatively connected to said cache controller, said clocking circuit comprising:
   means for increasing the time duration of signals transmitted to said support interface circuitry from said cache controller wherein said means for increasing the time duration is coupled to said cache controller and to said support interface circuitry;
   means for decreasing the time duration of signals transmitted to said cache controller from said support interface circuitry; and
   means for receiving a clock signal which drives said microprocessor and said cache controller and for supplying to said support interface circuitry a support clock signal having a frequency lower than that of said clock signal.

2. A clocking control circuit as recited in claim 1 further comprising means for synchronizing an internal clock signal of said microprocessor with said support clock signal.

3. A clocking control circuit as recited in claim 1 further comprising means for delaying signals transmitted from said cache controller to said support interface circuitry.

4. A clocking control circuit as recited in claim 1 wherein said computer system includes a co-processor, and wherein said clocking control circuit further comprises means for synchronizing an internal clock signal of said co-processor with said support clock signal.

5. The clocking control circuit as recited in claim 1 wherein said support interface circuitry includes a peripheral controller and a bus bridge interface.

6. A method for operating a computer system having a microprocessor, a cache controller operatively connected to said microprocessor for controlling cache memory, and support interface circuitry operatively connected to said cache controller, said method comprising the steps of:
   increasing the time duration of signals transmitted to said support interface circuitry from said cache controller; and
   decreasing the time duration of signals transmitted to said cache controller from said support interface circuitry;
   receiving a first clock signal which drives said microprocessor and said cache controller; and
   supplying a support clock signal to said support interface circuitry having a frequency lower than that of said first clock signal.

7. A method for operating a computer system as recited in claim 6 further comprising the step of synchronizing an internal clock signal of said microprocessor with said support clock signal.

8. A method for operating a computer system as recited in claim 6 further comprising the step of delaying signals transmitted from said cache controller to said support interface circuitry.

* * * * *